United States Patent [19]

Imamura

[11] Patent Number: 5,159,385

[45] Date of Patent: Oct. 27, 1992

[54] TOTAL PHOTOFINISHING LABORATORY SYSTEM

[75] Inventor: Takashi Imamura, Kanagawa, Japan

[73] Assignee: Fuji Photo Film Co., Ltd., Kanagawa, Japan

[21] Appl. No.: 728,506

[22] Filed: Jul. 11, 1991

[30] Foreign Application Priority Data

Jul. 11, 1990 [JP] Japan ................................. 2-183357
Jul. 12, 1990 [JP] Japan ................................. 2-185051
Jul. 18, 1990 [JP] Japan ................................. 2-190319

[51] Int. Cl.⁵ ............................................. G03B 29/00
[52] U.S. Cl. ........................................ 355/28; 355/29; 355/40
[58] Field of Search ............................. 355/28, 29, 40

[56] References Cited

U.S. PATENT DOCUMENTS

| | | | |
|---|---|---|---|
| 4,039,258 | 8/1977 | Hujer et al. | 355/27 |
| 4,293,215 | 10/1981 | Rosborough, Jr. et al. | |
| 4,405,227 | 9/1983 | Inoue et al. | 355/27 |
| 4,574,692 | 3/1986 | Wahli | 355/40 |
| 4,577,956 | 3/1986 | Klosterhuber et al. | 355/40 |
| 4,779,122 | 10/1988 | Signoretto | 355/40 |
| 4,800,406 | 1/1989 | Signoretto | 355/40 |
| 4,821,061 | 4/1989 | Gudmundson et al. | 355/40 |
| 4,933,711 | 6/1990 | Gudmundson et al. | 355/40 |

*Primary Examiner*—Monroe H. Hayes
*Attorney, Agent, or Firm*—Sughrue, Mion, Zinn, Macpeak & Seas

[57] ABSTRACT

A total photo-lab system for automatic printing processing, cutting, sorting and enveloping. Each of a plurality of films spliced into a film roll is provided with a label printed with a respective ID number bar code. The same ID number bar code is provided on a respective envelope. During printing, the ID number of each film set in a printing position is read out so as to record a punch code indicative of the same ID number on a photographic paper besides the first print frame made from that film. The printed film is reserved until the corresponding print frames have been processed. The ID number of the processed photographic paper is read and compared with the ID number of the reserved film. When these ID numbers are identical, the film is cut and inserted into a film sheath sheet, whereas the photographic paper is cut into individual prints, and are sorted into each set of prints belonging to the same film. The film sheath sheet is inserted into the envelope having the same ID number as the film contained in that film sheath sheet, and then the prints having the same ID number are inserted therein.

29 Claims, 8 Drawing Sheets

FIG. 7

TOTAL PHOTOFINISHING LABORATORY SYSTEM

BACKGROUND OF THE INVENTION

1. Field of the Invention

The present invention relates to a total photo-lab (photofinishing laboratory) system, and particularly to an apparatus for, and method of, automatically collating, sorting and enveloping photographic films and photographic prints.

2. Description of the Prior Art

Conventionally, photographic prints produced by a printer-processor are sorted out by a collating sorter for collating photographic prints with photographic films and sorting the prints into respective sets, each corresponding to the same photographic film. A photographic film, from which one set of the prints was made, is cut into pieces each having six original image frames, and the film pieces are inserted in a film sheath. The photographic film inserted in the film sheath is put on a collation table, and is lit from the back so as to compare the negative images of the original frames with the positive images of the resulting prints. When it is verified that the negative images are identical with the positive images, the photographic film wrapped with the film sheath and the corresponding prints are enclosed in an envelope together.

It has previously been necessary to manually collate the negative images of the photographic film with the prints made therefrom. This is very labor intensive and thus inefficient. In addition to this, the need for a collation table for manually checking the images necessitates that the photo-lab be relatively large to accommodate the same.

SUMMARY OF THE INVENTION

In view of the foregoing, an object of the present invention is to provide a total photo-lab system wherein the photographic film and associated prints are automatically sorted, collated and properly placed in envelopes.

Another object of the invention is to provide a printer-processor wherein printing can be efficiently performed even when a photographic paper has jammed in the printer or processor section.

To achieve the above and other objects, a total photo-lab system of the present invention includes a device for providing a mechanically readable ID number code, such as bar code, on each film, and a bar code reader, or the like, for reading the ID number code of the film during printing. The ID number read by the reader is recorded on a photographic paper in association with prints made from the film. A second reader reads the ID number recorded on the photographic paper having been processed for the purpose of correlation. The processed photographic paper is cut into individual prints, and the prints are sorted according to the ID number. A third reader reads the ID number of the printed film before cutting, the ID number read out by the second ID number reader is compared with the ID number read out by the third ID number reader and the film cutting and inserting device is activated when these ID numbers are identical.

It is preferable to provide the envelope with the same ID number as the ID number of the film, so as to automatically insert the film and the consequent prints together in the envelope with reference to the ID number. In this embodiment, it is necessary to provide an ID number reader for reading the ID number of the envelope in the enveloping device.

According to a further embodiment of the present invention, the total photo-lab system also has a device for recording a photofinishing price on the envelope.

The total photo-lab system of the invention can be easily constructed by retrofitting a conventional printer-processor with the readers and enveloping device.

BRIEF DESCRIPTION OF THE INVENTION

The above, and other, objects of the present invention will become apparent from the following detailed description of preferred embodiments when read in conjunction with the accompanying drawings, wherein.

DETAILED DESCRIPTION OF THE PREFERRED EMBODIMENTS

Figure 1:
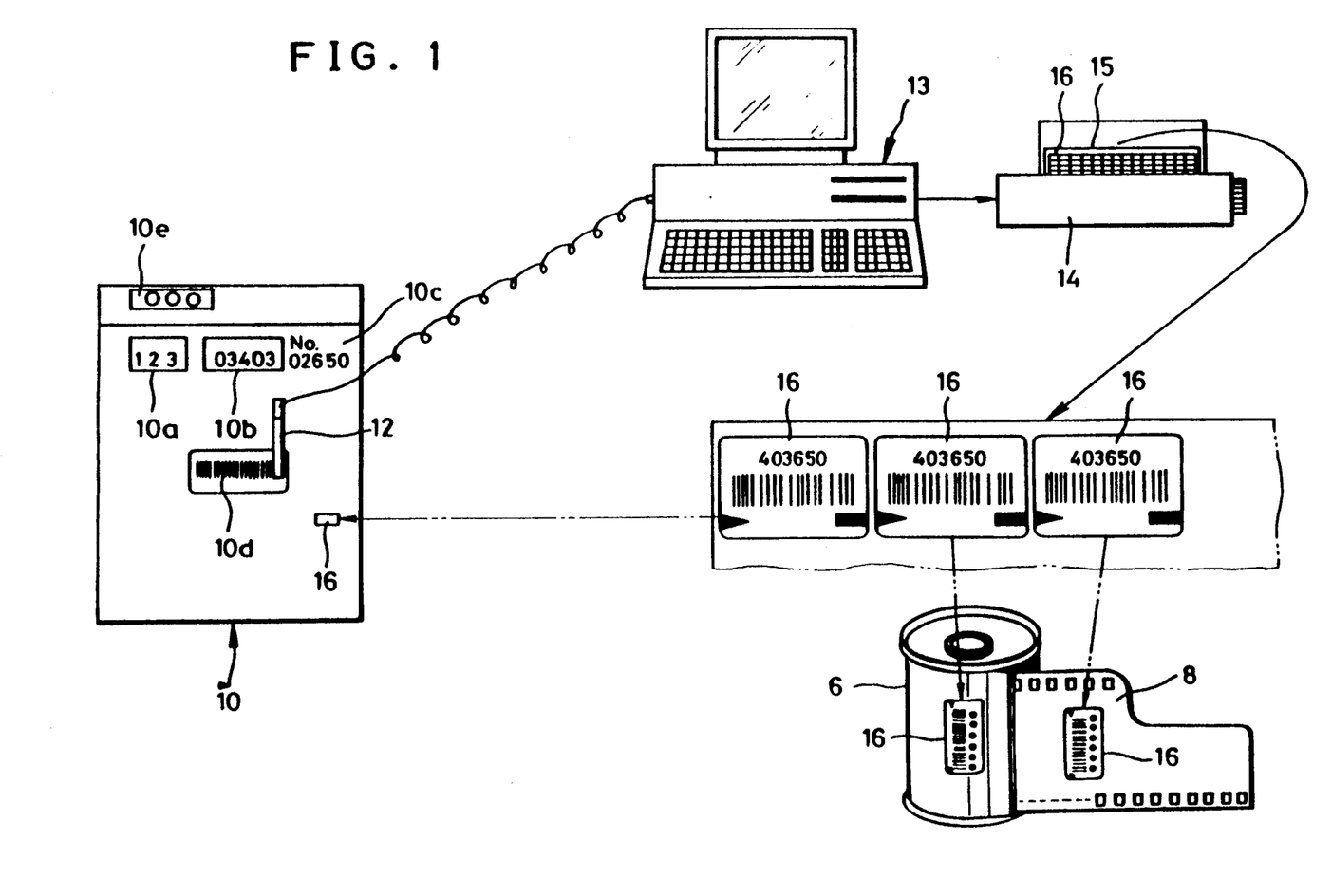
FIG. 1 is a schematic representation showing a reception process of a cassette film forwarded to a photo-lab.
Figure 2:
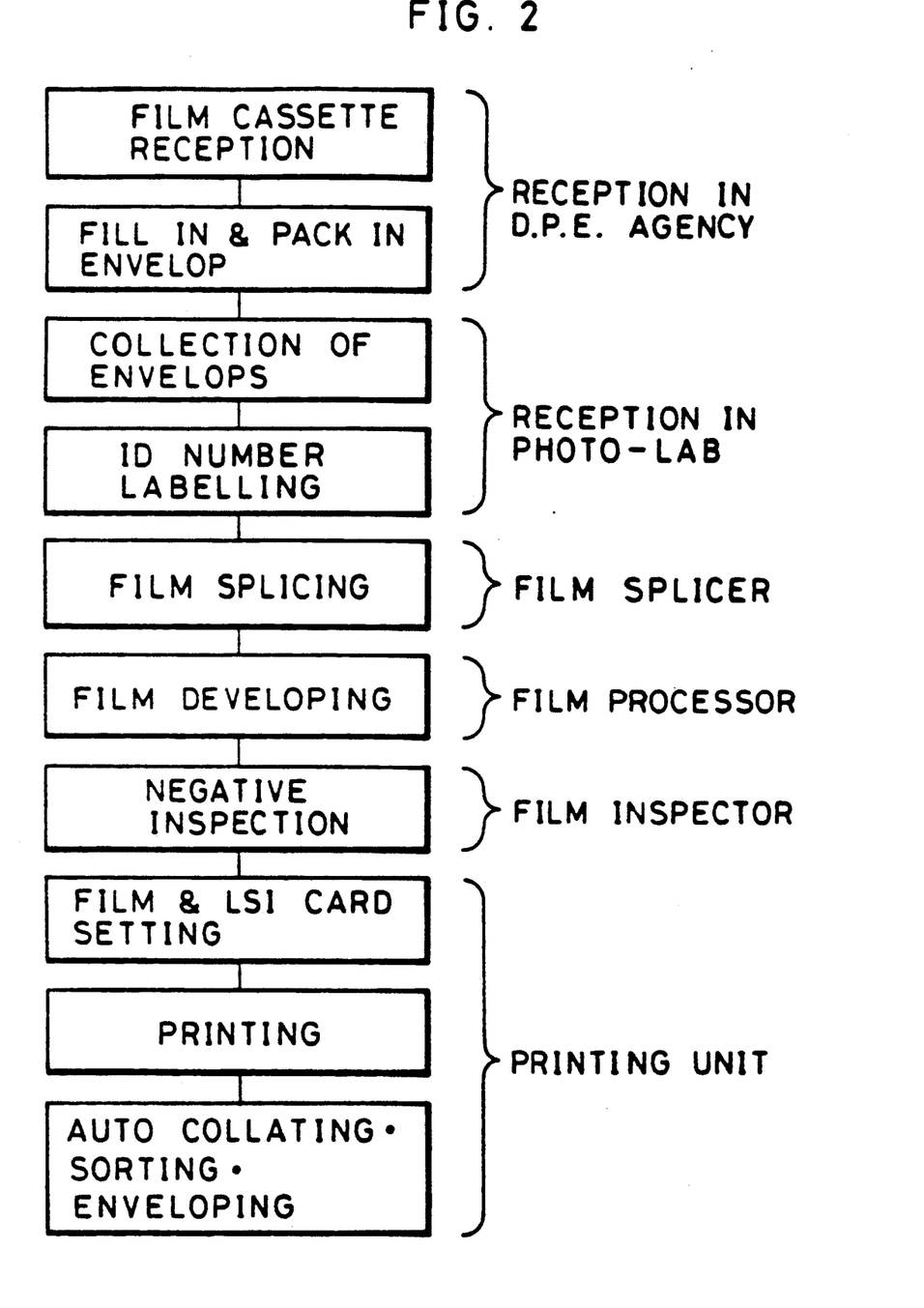
FIG. 2 is a flow chart of the overall photofinishing processes.

As illustrated in FIGS. 1 and 2, typically a cassette film 6 containing a roll of exposed film 8 is forwarded to an agency mediating the customer's order for photofinishing, wherein cassette film 6 is packed in a prescribed customer's order envelope 10 printed with ID numbers such as a collection route identifying number 10a, an agency identifying number 10b, a reception number 10c, as well as with a bar code 10d representative of these ID numbers. Subsequently, the name and telephone number of the customer is printed on a predetermined portion 10e of the envelope 10. The envelope 10 enclosing the cassette film 6 is forwarded to a photo-lab for processing.

In the reception process in the photo-lab, as shown in FIG. 1, bar code 10d on envelope 10 is read by bar code sensor 12. A bar code signal from bar code sensor 12 is sent to reception unit 13 consisting of a conventional personal computer. Reception unit 13 makes a 6-digit ID number consisting of numerals in the lowest three significant positions of agency identification number 10b, 4-0-3, for instance, and numerals in the lowest three significant position of reception number 10c, 6-5-0, for instance. The ID number, "403650" for instance, and an ID number code, e.g. a bar code indicative of the ID number, are printed onto label form 15, thereby making ID number label 16, wherein at once three ID number labels 16 having the same ID number and the same ID bar code are made. The three ID number labels 16 are respectively placed onto envelope 10, cassette 6 and a leader portion of film strip 8 pulled out from cassette 6.

Film strip 8, with ID number label 16 and other film strips pulled out from other film cassettes having different ID number labels are spliced by a conventional film splicer into a long film. The thusly spliced film is wound into a roll, and when the total length of the spliced film reaches a predetermined value, the roll of spliced film is sent to a film processor for development.

After development, the spliced film is forwarded to a film inspector for inspection of the negative images of the respective original frames. The original frame determined to be printed is marked by a notch formed near that original frame by cutting out one edge of the film. Of course, if the quality of a particular frame is so poor that printing is impossible, even after correction, no notch is marked. If an original frame needs be corrected, density correction data and color collection data for optimum printing cable can be entered. The correction data, as well as a data relating to the number of notches, the spacing between the splicing tape and the leading notch, and the spacing between the notches are stored in a memory area along with the respective ID numbers. If the film is recorded with frame number bar codes on one edge thereof, the frame numbers of the notched original frames, that is, data on the original frames to be printed, are also stored in the memory.

Figure 3:
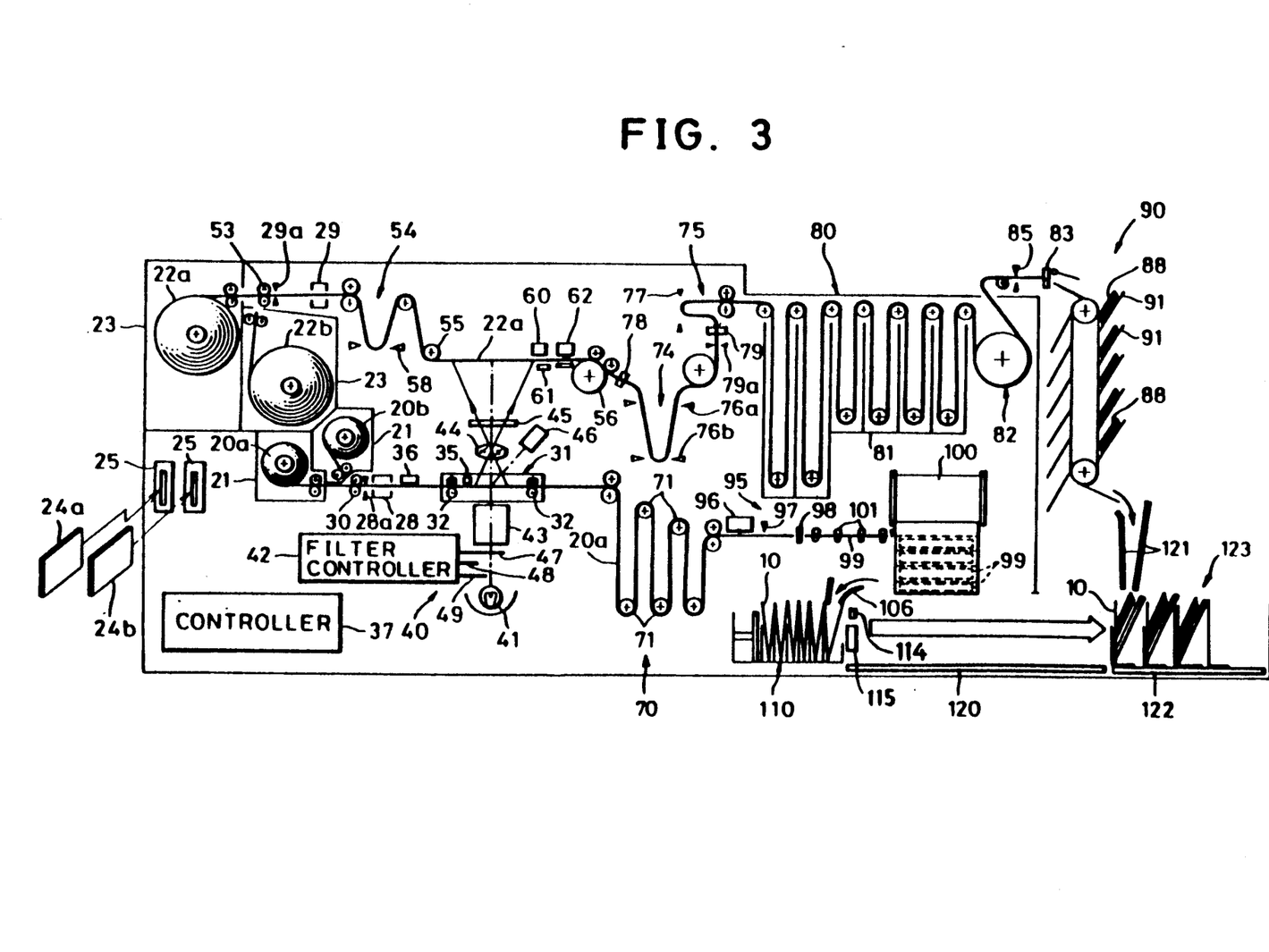
FIG. 3 illustrates a total photo-lab system embodying the present invention which automatically performs, printing, processing, and enveloping.

After inspection, the spliced film is set in a printing unit as shown in FIG. 3. The printing unit has a pair of film loading sections 21 for loading one or two rolls of spliced film 20a and 20b therein, a pair of paper loading sections 23 for loading one or two rolls of color paper 22a and 22b therein. Also, a pair of card loading sections 25 for receiving one or two LSI memory cards 24a and 24b is included for storing the negative image inspection data.

Splicer 28 disposed near exits of film loading sections 21 splices the trailing end of one of the two rolls of spliced films 20a and 20b to the leading end of the other roll of spliced film, while splicer 29 disposed near exits of the paper loading sections 23 splices the trailing end of one of the two color paper rolls to the leading end of the other paper roll. End sensors 28a and 29a are disposed proximate splicers 28 and 29 respectively, at the exits of film loading section 21 and paper loading section 23. End sensor 28a detects the trailing end of the preceding spliced film and the leading end of the following spliced film, so as to position the trailing end and leading end of the spliced films 20a and 20b properly in splicer 28. End sensor 29a functions similarly in relation to the color papers 22a and 22b. The trailing and/or leading end of the spliced films and/or color papers are appropriately cut off for splicing, and any resulting waste paper is thrown away through a discharge passageway.

Film feed rollers 30 are disposed near the exit of film loading section 21 so as to pull out, alternately, spliced film 20a or 20b. Spliced film 20a presently pulled out from film loading section 21 is transported through film splicer 28 and is, thereafter, positioned in a print station within film carrier 31 by means of two pairs of print station feed rollers 32. Film carrier 31 is provided with notch sensor 35 for detecting the notches. An outputted notch signal corresponding to notches detected by notch sensor 35 is sent to controller 37.

First ID number reader 36, which is disposed between splicer 28 and film carrier 31, optically reads the ID number printed on ID number labels 16 placed on the respective leader portions of the individual pieces of film 8 spliced into spliced film 20a, and sends a signal, corresponding to the ID number, to controller 37.

Controller 37 is a conventional microcomputer, and controls the respective sections of the printing unit according to a program sorted in a ROM. Initially, controller 37 judges whether the ID number read from ID number label 16 is identical with the ID number of the leading film of a series of films 8 spliced into long film 20a, that is registered in memory card 24a loaded in card loading section 25. If not, an alarm sound, or other warning, is generated. If both ID numbers are identical, a series of print data are read out from memory card 24a for each ID number. The print data includes general print data common to all original frames of the same film 8 identified by ID number label 16, and individual print data on the respective original frames to be printed. The general print-data includes print channel data for setting an optimum printing condition depending on the type of film 8, data on the spacing between the splicing tape and the first notch (film transport amount), data on the spacing between the notches, data on the number of prints that can be made from individual film 8, i.e., the number of notches formed in individual film 8, as well as data on the size of each frame, i.e., whether the original frame is full size or half size. The individual print data includes data about each individual frame to be printed, such as manual density and color correction values, automatic color correction value as well as a frame number. The individual print data is recorded in memory card 24a in the same sequence as the corresponding original frames on the spliced film 20a, with distinction of splicing positions of spliced film 20a.

Upon the detection of a notch by sensor 35, controller 37 begins to set the original frame designated by that notch in the printing station of film carrier 31 by coordinating the notch detection and film transporting speed. Printer section 40 includes light source 41, filter controller 42, diffusing box 43, printing lens 44, shutter 45, and photosensor 46, as is well known in the art. When photosensor 46 measures an LATD (large area transmittance density) of the original frame set in the printing station, the controller calculates an exposure based on the LATD and the correction data read from memory card 24a. Based on the calculated exposure, filter controller 42 is driven to set three color filters, 47, 48, and 49, in proper locations, thereby controlling the color balance of light from light source 41. The controlled light passes through the negative image of printing lens 44 and forms a corresponding optical image on color paper 22a or 22b set in a printing station, color paper 22a for instance, and photographically prints the image onto color paper 22a when shutter 45 is opened.

Color paper 22a is advanced by a pair of pull out rollers 53 from paper loading section 23, and is transported through first paper reservoir 54 and, thereafter, is set in the printing station by means of guide rollers 55 and a pair of feed rollers 56. First reservoir 54 is adapted to absorb the delay time of paper transportation at splicer 29 that is necessary for splicing color papers 22a and 22b, as well as to keep the load or advancing paper constant. Loop sensor 58 controls the length of the loop in first paper reservoir 54 as to be slightly longer than the length by which the paper would be transported during a splicing operation. At the exit of the paper printing station, there are disposed data printing head 60, latent ID code recorder 61 and puncher 62.

Figure 4:
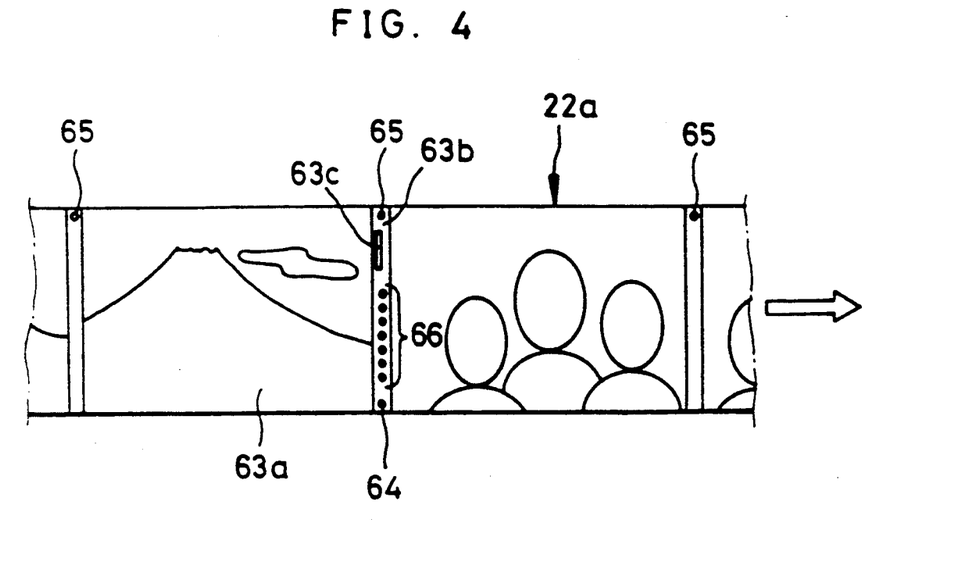
FIG. 4 is a plane view of a photographic paper provided with cut-marks, sort-marks, ID number marks, and other data in a blank portion between print frames.

Data printing head 60 prints data on the rear side of exposed portion of color paper 22a that includes the frame number and the correction data of the corresponding original frame, and/or the ID number of individual film 8 to which that original frame belongs. Latent ID code recorder 61 has an optical printing head which prints ID number 63c as a latent image onto blank 63b at a leading margin of leading frame 63a of a series of print frames made from the individual film 8 that is identified by this ID number 63c, so that the operator can see the ID number 63c when the printing unit is disassembled, for example, when the machine has jammed. ID number 63c is chopped out with blank 63b when printed color paper 22a is cut into individual prints.

Punch unit 62 punches out sort mark 64, cut mark 65 and ID number mark 66 also in the blank 63b before leading print frame 63a made from the leading original frame of individual film 8. Sort mark 64 is disposed on one edge of color paper 22a, and indicates the end of film 8, that is, the beginning of the next of film 8. Cut mark 65 is disposed on the opposite edge of color paper 22a. Cut mark 65 is provided not only in blank 63b but also in other blanks between the print frames. Cut marks 65 indicate the positions at which color paper 22a must be cut into individual prints. ID number mark 66 is also disposed in blank 63b, as is ID number 63c, so as to form a perforation patter representative of a 7-bit binary code indicative of two numerals in the lowest two significant positions of the ID number. ID number mark 66 is used for automatic collation of print frames on color paper 22a or 22b with the negative images of the original frames on photographic film 20a or 20b.

After each exposure, color paper 22a is provided with the above described marks and the data printed on the rear thereof and, thereafter, is advanced by one frame, while spliced film 20a is correspondingly advanced by one frame. In order to advance spliced film 20a by one frame, it is transported by a predetermined amount after detecting the notch associated with each original frame. The original frame from which a print has been made is transported to film stock section 70, wherein spliced film 20a is accumulated by travelling around a plurality of guide rollers 71 which are movable up and down relative to each other, so that a certain length of spliced film 20a is always accumulated in film stock section 70. The stocked amount of spliced film 20a is predetermined depending on the capacity of processor section 80. Specifically, an original frame of spliced film 20a stays in film stock section 70 until the corresponding print frame, that is, the print frame made from this original frame is discharged from the processor section 80. In the present embodiment, the stocked amount corresponds to 10 strips of 24-exposure films.

On the other hand, the printed portion of color paper 22a is reserved in second paper reservoir 74 such that the length of a paper loop in second reservoir 74 is maintained based on signals from loop sensors 76a and 76b. Second paper reservoir 74 compensates for the difference between printing speed in printer section 40 and processing speed in processor section 80. At the entrances of second paper reservoir 74, there is disposed first paper cutter 78 which is used to cut color paper 22a at the last cut mark position when a printing operation is terminated. At the exit of second paper reservoir 74, a second cutter 79 is disposed, which is activated when the printing process is temporarily interrupted, so as to cut color paper 22a at a cut mark position that is detected by cut mark sensor 79a disposed immediately before second paper cutter 79. Third paper reservoir 75 is provided to compensate for the cutting time at second paper cutter 79, and thus reserves a quantity of color paper 22a that is 22a would be transported during the cutting time.

Processor section 80 includes a series of processing tanks 81. Color paper 22a is sequentially transported through processing tanks 81, and is dried in drying portion 82. Thereafter, color paper 22a is cut by third paper cutter 83 into individual prints 88. At the entrance of third paper cutter 83, mark sensor 85 is disposed for detecting sort marks 64, cut mars 65, and ID number marks 66, so that third cutter 83 cuts color paper 22a along each blank between the print frames on the basis of a cut mark detection signal from mark sensor 85, whereby the marks are chopped out with the blanks. Individual prints 88 are sequentially piled in stack 91 of cutting-sorter section 90. Stacks 91 are moved simultaneously by one step for each sort mark signal, so that each stack 91 holds a set of prints 88 sorted for each ID number.

An ID number signal from mark sensor 85 is sent to controller 37, which then transports spliced film 20a, by a predetermined amount, from film stock section 70 to film sheathing section 95 in response to the ID number signal. Film sheathing section 95 comprises second ID number reader 96, notch sensor 97 and cutter 98. An ID number signal from second ID number reader 96 is sent to controller 37, and is compared with the ID number detected by mark sensor 85 from printed color paper 22a. If the two ID numbers are identical, individual film 8 of spliced film 20a, that is identified by that ID number, is cut into pieces 99, each having 6 frames. Film pieces 99 are sequentially transported by roller pairs 101 so as to be inserted into film sheaths 100. IF the ID number should not be identical, an alarm sound, or the like, is generated.

Film sheaths 100 are stored in the form of a roll of sheath sheets, as is well-known in the art, and each film sheath 100 is located successively in a predetermined film piece inserting position. Each time a set of film pieces 99 that belong to the same film 8 have been inserted in film sheaths 100, the film sheath roll is cut into an individual sheet containing film sheaths 100, and the film sheath sheet is inserted in a corresponding one of envelopes 10 whose ID number is read by a sensor 114 and is determined as identical with the ID number of the film contained in the film sheath sheet.

Envelopes 10 are arranged in an enveloping section 110 in order of splicing of the individual films 8, and are set in turn in a film sheath enveloping position that is disposed under guide member 106. Guide member 106 not only guides film sheath 100 into envelope 10, but also keeps envelope 10 open. Guide member 106 may be replaced by an air jet device, which jets air into envelope 10, or the like.

In the film sheath enveloping position, there is disposed sensor 114 and printer 115 for printing prices of photofinishing, or the like, on envelope 10. Depending on the ID number read by sensor 114, the number of prints made from the individual film is read out from memory card 24, the printing price, and a developing price and a total price are calculated based on this print number, which are then printed by printer 115 onto envelope 10. The price printing is performed prior to sheathing and enveloping of the film.

Envelope 10 containing a sheet of film sheaths 100 is transported through an envelope transporting section 120 toward a print enveloping position below cutting-sorter section 90, and is located in the print enveloping position when one of stacks 91 that holds a set of prints 88 designated by the same ID number as film pieces 99 in a corresponding film sheath 100, is moved into a predetermined position. Upon detection of the next sort mark by mark sensor 85, stacks 91 of cutting-sorter section 90 are moved by one step, whereby the corresponding set of prints 88 are thrown down into envelope 10 through print chute 121. Envelope transporting section 120 is constructed of an endless belt conveyer, or the like.

Envelopes 10 containing prints 88 and film pieces 99 are transported through second envelope transporting section 122 toward envelope stock section 123.

The overall operation of the above described embodiment of FIG. 3 will be described below.

Spliced film roll 20a is, after inspection, set in one film loading section 21, while memory card 24a, having corresponding negative inspection data stored therein, is set in card loading section 25. The second spliced film roll 20b is also set in other film loading section 21, and corresponding memory card 24b is set in other card loading section 25. While spliced film 20a is drawn out from film loading section 21 by means of film feed roller pair 30, an ID number of the leading film of a series of films spliced into film roll 20a is read by ID number reader 36. Controller 37 compares the ID number with an ID number recorded as the ID number of the leading film in memory card 24a. If these ID numbers are identical, spliced film 20a is transported into film carrier 31. If not, an alarm sound is generated so as to indicate that memory card 24a does not correspond to spliced film 20a and thus the operator must correct this situation.

The original frame determined to be printed is set in the printing position, and the image thereof is printed on color paper 22a by printer section 40 on the basis of the print data for proper printing recorded in memory card 24a. Thereafter, the next original frame to be printed is set in the printing position. Puncher 62 records sort mark 64, cut mark 65 and ID number mark 66 in blank 63b of color paper 20a besides the leading margin of leading print frame 63a made from the leading original frame of individual film 8. Back printing head 60 prints a frame number on the back of each printed frame, the same frame number as the corresponding original frame. Cut mark 65 is formed in each blank between the printed frames. Blank 63b beside the leading print frame 63a is further printed with the ID number as a latent image by means of latent ID code recorder 61.

After printing, spliced film 20a is transported to film stock section 70, and is accumulated by a predetermined length therein, while printed color paper 22a is accumulated as paper loops in second and third paper reservoirs 74 and 75. Color paper 22a is then transported to processor section 80 for development.

Printed color paper 22a is cut into individual prints 88 in accordance with the cut mark signals from mark sensor 85. Prints 88 are sorted into stacks 91 of cutting-sorter section 90. When mark sensor 85 detects ID number mark 66, individual film 8 of spliced film 20a identified by the corresponding ID number is transported from film stock section 70 to film sheathing section 95, wherein individual film 8 is cut into pieces 99 with reference to the notches formed on the edge thereof, and film pieces 99 are inserted into film sheaths 100. In this way, spliced film 20a will not be cut into pieces until it is confirmed that all the proper original frames recorded in individual film 8 have been printed. Therefore, even if color paper 22a has jammed in processor section 80, or other sections, and some print frames are damaged, it is possible and convenient to perform printing of damaged frames once again by resetting the corresponding original frames in the printing position after rewinding spliced film 20a.

The individual film 8 may also be cut into pieces when the next sort mark 64 is detected after the detection of the corresponding ID number 66, that is, when it is confirmed that all prints 88 made from film 8 have been sorted into on of stacks 91. In this way, it becomes possible to conveniently perform a renewal printing even if a problem occurs in cutting-sorter section 90.

A sheet of film sheaths 100 containing a set of film pieces 99 are inserted in envelope 10 having corresponding ID number label 16 and having been printed with the photofinishing price. Thereafter, the correspondingly sorted prints 88 are inserted into envelope 10 set in the print enveloping position. Envelopes 10 containing prints 88 and film pieces 99 are then transported to envelope stock section 123.

Figure 5:
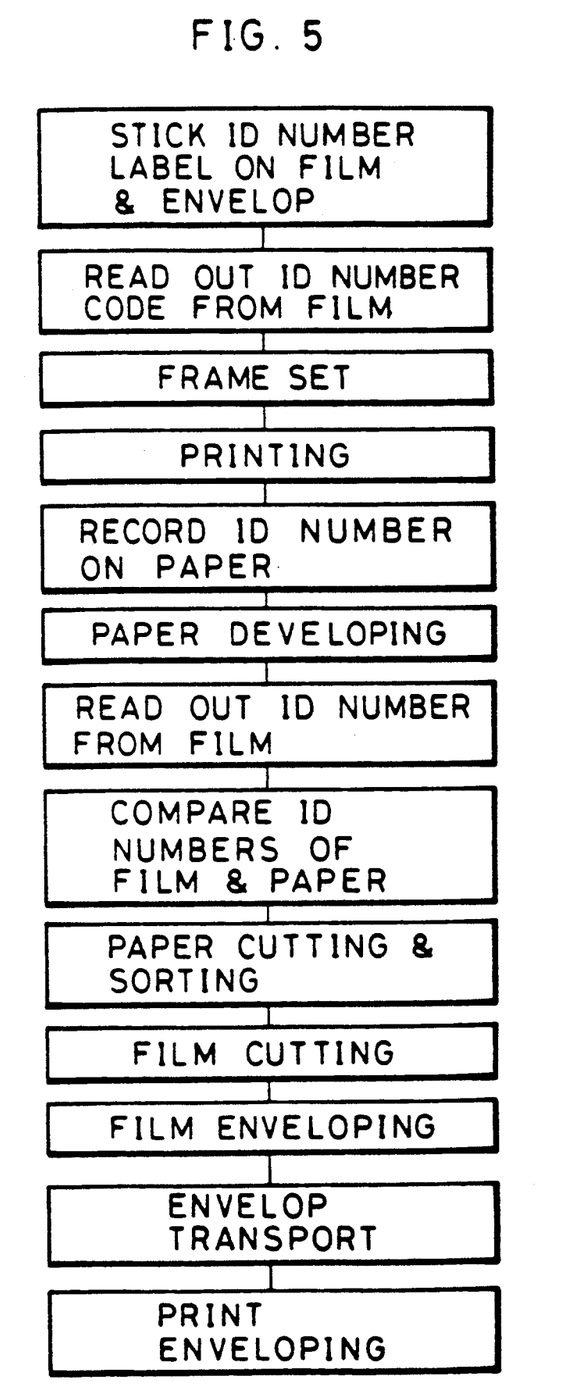
FIG. 5 is a flow chart showing the procedure of operation in the total photo-lab system of the invention.

When the trailing end of spliced film roll 20a is detected by end sensor 28a, the trailing end is cut off in film splicer 28 so as to facilitate the splicing of film roll 20a with second film roll 20b. Thereafter, the leading end of second film 20b is drawn out from other film loading section 21, transported through feed roller pair 30 into film splicer 28, and cut off for splicing. After the trailing end of film roll 20a and the leading end of second film roll 20b are spliced, the processes as described above are executed. While second film roll 20b is subjected to printing, another spliced film roll is set in film loading section 21. Also, color paper rolls 22a and 22b are spliced in the same way as for film rolls 20a and 20b. The flow chart of FIG. 5 briefly shows the sequence of the operation as described so far.

Figure 6:
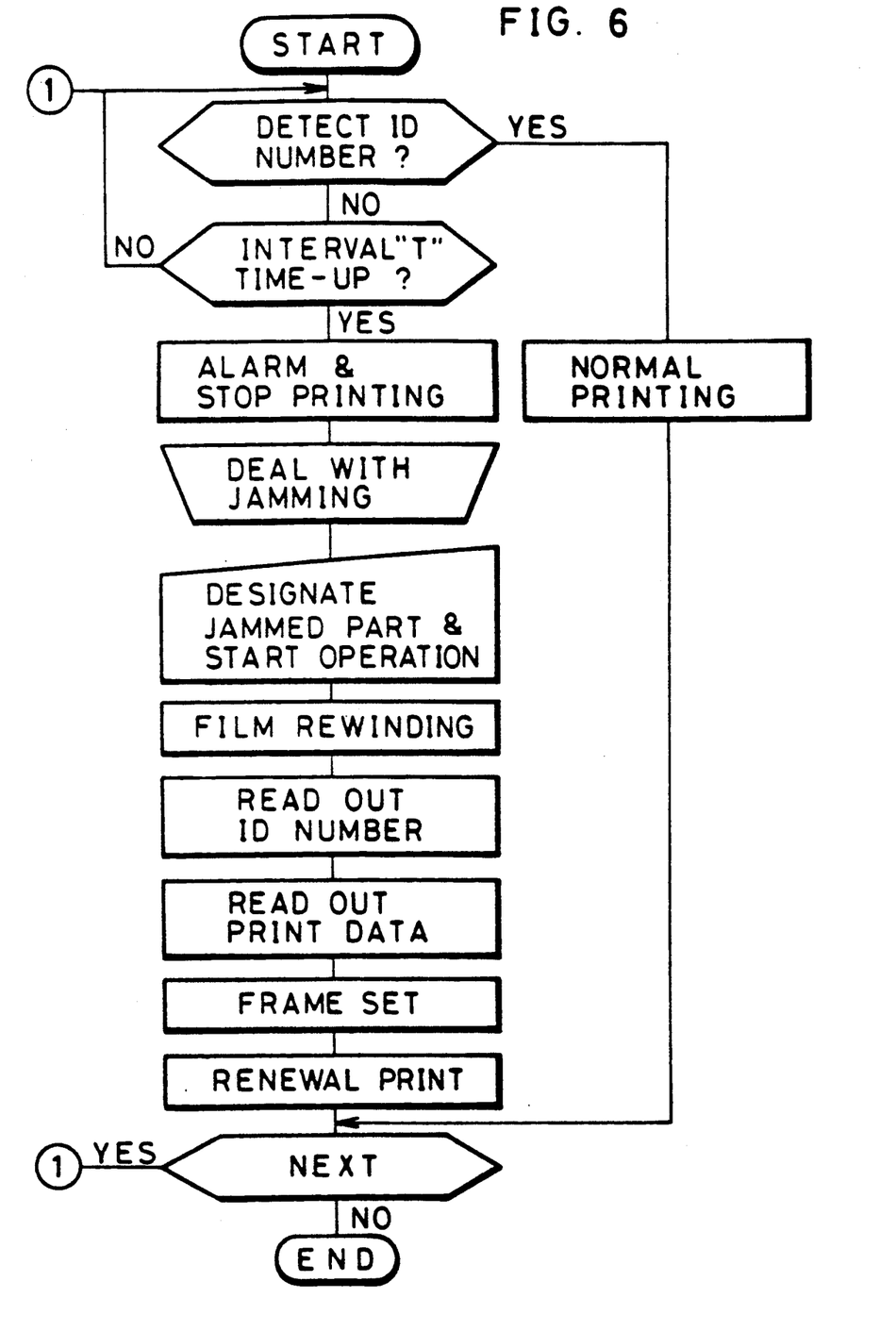
FIG. 6 is a flow chart showing a procedure of renewal of printing in case the photographic paper has jammed.

FIG. 6 shows a sequence of printing in the case of jamming of color paper in processor section 80.

If no ID number mark is detected by mark sensor 85 within a certain time interval T, controller 37 judges that the color paper has jammed in processor section 80, and stops printing while causing an alarm sound. The time interval T is not constant, and is determined based upon a known paper processing time that is normally necessary for printing and processing a frame, i.e., the time necessary for transporting a printed frame from the printing position to the exit of processing section 80. After detecting the first ID number, time interval T begins at the time at which printing of the first frame is started, and ends up when the normal paper processing time has elapsed. As for the second and following ID numbers, time interval T starts from the time at which the preceding ID number is detected. Because the number of the prints made from an individual film varies, time interval T between the ID numbers must change depending on the print number of the individual film. Therefore, the number of prints predetermined to be made from the individual film is read out from memory card 24a upon each detection of the ID number, so as to calculate time interval T for each ID number based on the number of prints and the normal paper processing time.

When color paper 22a has jammed, the operator removes the jammed portion of paper, and restores color paper 22a to a normal condition. Thereafter, each frame to be printed again is designated b entering the corresponding ID number and notch number through a keyboard. Upon depressing a start button, the renewal printing is started. In the renewal printing, spliced film 20a is rewound from film stock section 70 to film loading section 21. During rewinding, the ID numbers assigned to the individual films of spliced film 20a are read in controller 37, so that controller 37 stops rewinding upon detecting the corresponding ID number. Thereafter, the film position is adjusted with reference to the notches so as to set the leading original frame to be printed again in the printing position of film carrier 31. The other frames to be printed again are sequentially printed in the same way.

Controller 37 also causes an alarm to sound when spliced film 20a has jammed in film carrier 31, film stock section 70 or film sheathing section 95. In such a case, the operator cuts out the jammed film portion, and/or inserts the proper film pieces into film sheaths 100. If a trouble occurs in price printing section 115, film enveloping section 110 or print enveloping section 122, an alarm sound is generated to indicate the necessity of manual operation.

Although the photofinishing price is printed directly on envelopment 10 in the described embodiment, it is possible to enclose a bill slip containing the photofinishing price with individual film 8 and prints 88.

In the above embodiment, ID number labels 16 are made on the basis of bar code 10d previously printed on envelope 10. but it may be possible to use preprinted ID number labels, and to put a set of ID number labels having the same ID number on envelope 10 and corresponding film 8.

The ID code is not necessarily such an ID number code as above, and could be a character or a mark. In order to make it possible to read the ID code mechanically, it is possible to use codes other than the above invention's bar codes, such as OCR (optical character recognition) characters or magnetically readable codes recorded on ID number labels.

Although film 8 and the prints 88 made therefrom are inserted in the same envelope 10 as used in the D.P.E. agency, it is possible to insert film 8 and prints 88 in a new envelope which is printed with the corresponding ID number, the name of the customer and so for the along with the photofinishing price. In this case, it is necessary to enter the customer's name together with the respective reception number and the other data into the reception unit through the keyboard when making the respective set of ID number labels, so as to memorize the customer's name along with the ID number in memory cards 24a and 24b. It is also possible to insert the new envelope in the envelope originally containing the corresponding film.

It may be possible to designate more than one film by the same ID number if printing of these films are simultaneously ordered by the same customer.

According to the above embodiment, there are provided a pair of film loading sections 21, a pair of paper loading sections 23, and a pair of card loading sections 25. Each par is alternately used so as not to interrupt the printing and processing when loading a new spliced film roll, a new color paper roll and a new memory card. However, it is possible to provide a single film loading section, a single paper loading section, or a single card loading section.

Figure 7:
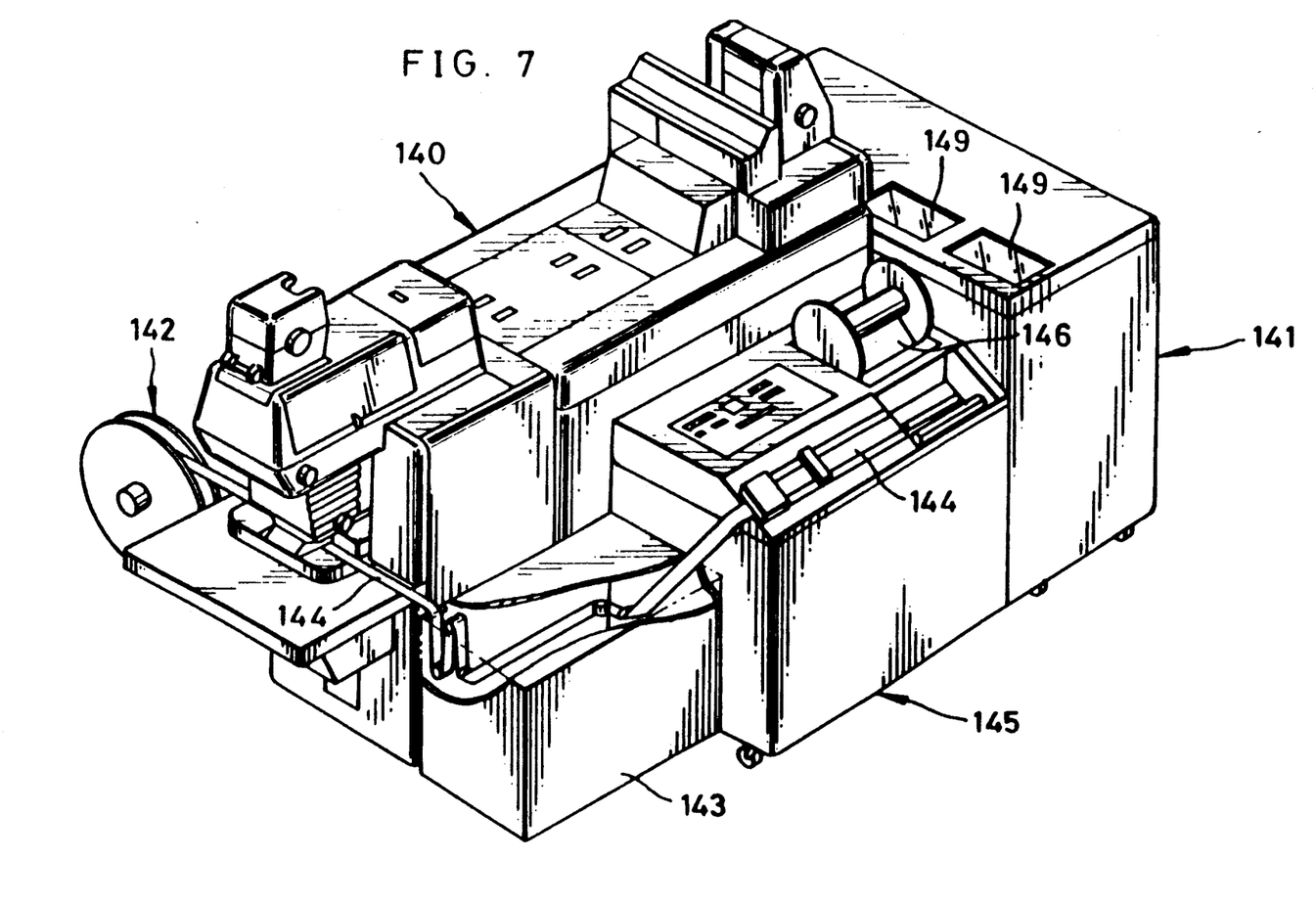
FIG. 7 is a perspective view showing a separate automatic enveloping apparatus connected to a printer-processor.

Furthermore, although the printing unit of the above embodiment includes a printer section, a processor section, a film cutting inserter (a film sheathing section), a print cutting-inserter (a sorter section and an enveloping section) and so forth, it is possible to provide these sections as separate units and connect them to each other. For example, as shown in FIG. 7, wherein conventional printer-processor 140 is connected to enveloping unit 141 for enveloping negatives and corresponding prints together. In this case, printer-processor 140 must have and ID code reader for detecting ID numbers of the individual films before printing, a puncher for recording the read ID numbers on the color paper after printing, and another ID code reader for detecting the ID numbers recorded on the color paper after processing the printed paper, in the same way as the above described embodiment, in addition to other conventional elements of printer-processor 140. Also film reel setting member 153 and film stock section 143 are disposed at the entrance and the exit of printer-processor 140, respectively.

Film stock section 163 reserves a quantity of gently folded filmstrips 144 as a film loop, and turns the film transporting direction by an angle of 90° to direct the film toward film cutting-inserter 145. Film cutting-inserter 145 cuts filmstrip 144 into film pieces, and inserts them into film sheaths 146. When a set of film pieces has been inserted, those film sheaths 146 are cut off from a film sheath roll into film sheath sheet 146. Film sheath sheet 146 is inserted into an envelope along with prints in enveloping unit 141 which is constructed similar to enveloping section 110 of FIG. 3.

Figure 8:
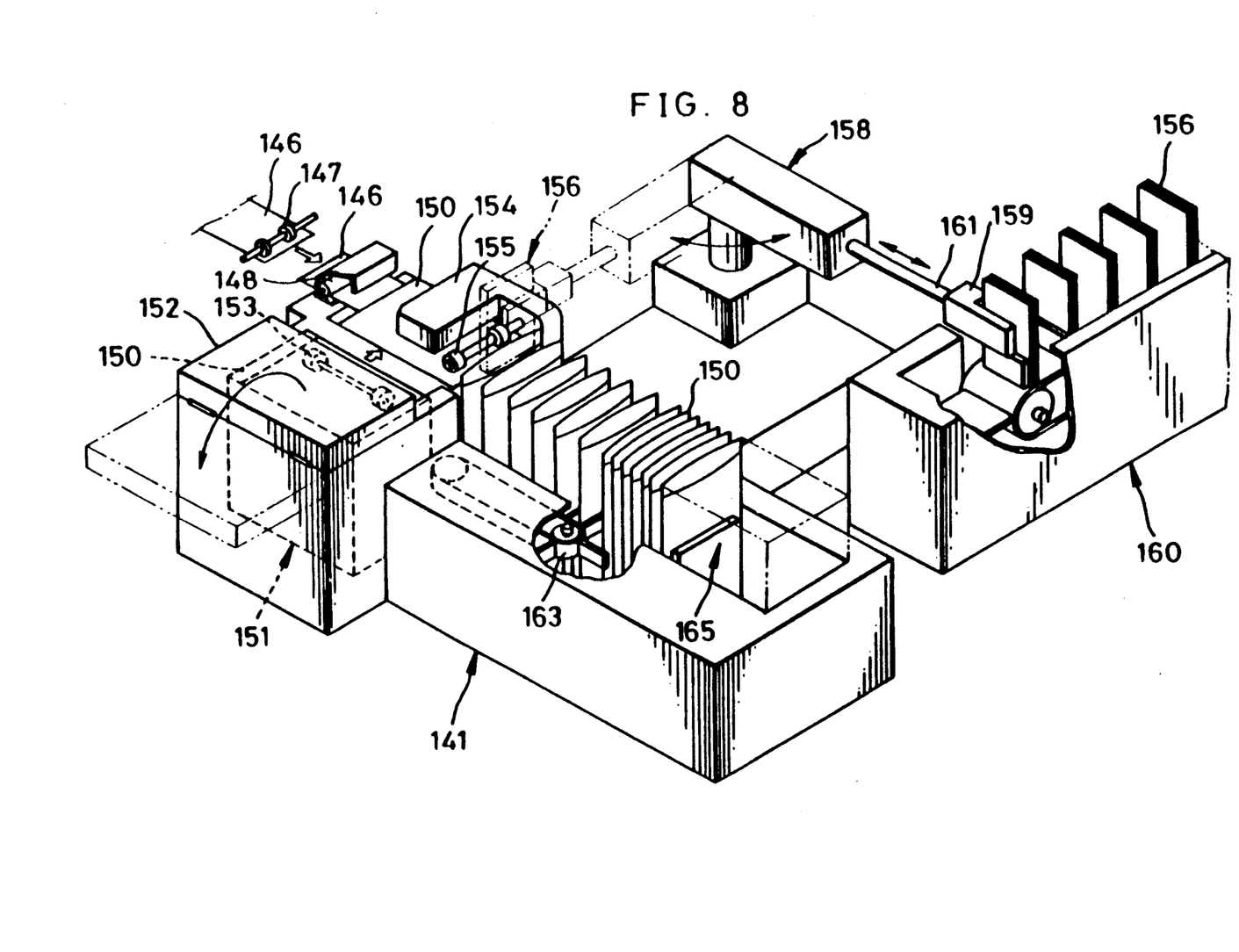
FIG. 8 is a view in partial section illustrating the interior of the automatic enveloping apparatus.

FIG. 8 illustrates essential parts of separate enveloping unit 141, wherein film sheath sheet 146 is transported by ejection rollers 147 and insertion rollers 148, and is sequentially inserted into the uppermost one of envelopes 150 piled in envelope reservoir 151. Feed rollers 153 disposed on the inner surface of lid 152 of envelope reservoir 151 is used to locate uppermost envelope 150 in a film sheath enveloping position. Printing unit 154 prints data such as a corresponding ID number code and the name of the customer on a predetermined location of envelope 150 before film sheath sheet 146 is enveloped.

After printing and envelopment, envelope 150 is transported by feed rollers 155 to print enveloping section 158 wherein envelope 150 is positioned vertically so that a set of prints 156 can be inserted into envelope 150.

Print enveloping section 158 comprises a hand robot which nips at its grip portion 159 one set of prints 156 sent from a sorter section 160, and takes out prints 156 therefrom by returning its arm portion 161. Arm portion 161 is then turned horizontally by an angle of 90°, so as to locate grip portion 159 in the print enveloping position, wherein prints 156 are released from grip portion 159 so as to fall into envelope 150. Envelope 150 is, thereafter, transported to envelope stock section 165 through envelope transporting section 163. In this way, the total photo-lab system of the present invention can be easily constructed using a conventional printer-processor 140 retrofitted enveloping unit 141 therewith and incorporating ID code sensors and recorders therein.

It is, of course, possible to enclose other optional elements such as an advertising bill with the film and prints. Although the prints are enveloped after the film, it is also possible to envelope the film and prints simultaneously, after lumping them together for each ID number.

It will be understood that the present invention is not intended to be limited by the above described embodiments, but, on the contrary, various modifications of the present invention can be effected without departing from the spirit and scope of the appended claims.

What is claimed is:

1. A photo-lab system for printing images recorded on a plurality of films onto a photographic paper and processing the photographic paper, said plurality of films being spliced into a film roll, comprising:

means for providing a respective first ID code for each of the films;

means for recording a second ID code, indicative of said first ID code onto the photographic paper;

a memory card for storing print data relating to the individual films of said spliced film roll along with their ID codes, the operation of the photo-lab system being based upon said print data;

a memory card loading section for loading said memory card;

means for comparing said first ID code on said film with said ID code stored on said memory card to obtain said print data corresponding to said first ID code;

means for printing images on the film roll onto the photographic paper;

a first ID code reader for reading said first ID code on each of the films when the films are positioned in said printing means;

means for processing the photographic paper;

a second ID code reader disposed after said processing means for reading said second ID code recorded on said photographic paper;

means for cutting the photographic paper into individual prints and sorting said prints into desired sets;

means for cutting and inserting each of the films into a film sheath sheet after printing;

a third ID code reader disposed between said printing means and said film cutting and inserting means, for reading said first ID code on each of the films after printing;

means for comparing said second ID code read by said second ID code reader with said first ID code read by said third ID code reader before said cutting and inserting means cuts said film; and enveloping means for inserting said film sheath sheet and a corresponding set of said prints according to a result of said comparing means, so as to envelope each of said set of prints together with the film having a corresponding ID code;

wherein at least two rolls of said spliced film, and at least two rolls of the photographic paper, are used alternatively so as to perform continuous operation without interruption for the purpose of loading a new spliced film roll or a new roll of photographic paper.

2. A photo-lab system, as claimed in claim 1, wherein said first ID code is a bar code.

3. A photo-lab system, as claimed in claim 2, wherein said second ID code recorded on said photographic paper is a punch code.

4. A photo-lab system, as claimed in claim 1, further comprising:

a film reservoir section, disposed before said film cutting and inserting section, for reserving the films after printing.

5. A photo-lab system as claimed in claim 4, wherein said film cutting and inserting means is activated when said first and second ID codes are identical.

6. A photo-lab system, as claimed in claim 4, wherein said third ID code reader is disposed between said film reservoir section and said film cutting and inserting means, the film is fed out from said film reservoir section after said first ID code is read out by said third code reader.

7. A photo-lab system, as claimed in claim 4, wherein said first ID code is disposed in a leading end of each of plurality of the films, and said second ID code is disposed in a leading margin of a print made from a leading frame of a corresponding film.

8. A photo-lab system as claimed in claim 2, wherein two labels having the same ID code are generated, one of said labels is placed on each film, thereby providing said first ID code on the film, another label is placed on each of said envelopes before printing, thereby providing a third ID code on each of said envelopes.

9. A photo-lab system, as claimed in claim 8, further comprising:

a fourth ID code reader for reading said third ID code on each of said envelopes, and means for comparing said third ID code, said first ID code, and said second ID code with each other, so as to said enveloping means inserts said film sheath sheet and a set of said prints into said envelope when ID codes thereon are identical.

10. A photo-lab system, as claimed in claim 9, further comprising pricing means for calculating and printing a photofinishing price on each of said envelopes with reference to said third ID code.

11. A photo-lab system, as claimed in claim 10, wherein said pricing means is disposed proximate said enveloping means, said pricing means performs said printing of photofinishing price one of before and after insertion of said film sheath sheet and said prints into said envelope.

12. A photo-lab system, as claimed in claim 1, wherein said enveloping means inserts said film sheath sheet into said envelope and, subsequently inserts a set of said prints into said envelope with reference to said ID codes.

13. A photo-lab system, as claimed in claim 1, further comprising:

means for providing each of said envelopes with said third ID code, corresponding to each of said first ID codes read by said third ID number reader, before inserting said film sheath sheet containing said film from which said first ID code corresponding to said third ID code is read.

14. A photo-lab system, as claimed in claim 1, further comprising:

means for detecting trailing and leading ends of each of said rolls of spliced film, and means for splicing said rolls of spliced film.

15. A photo-lab system, as claimed in claim 1, further comprising:

means for detecting trailing and leading ends of each of said rolls of photographic paper and means for splicing said rolls of photographic paper.

16. A photo-lab system, as claimed in claim 1, wherein said enveloping means includes an envelope reservoir for reserving a plurality of said envelopes, means for transporting said envelopes one after another to an enveloping position wherein said film sheath sheet and a set of said prints are inserted into a corresponding envelope.

17. A photo-lab system, as claimed in claim 16, wherein said envelopes are vertically stacked in said envelope reservoir, and are each located vertically in said enveloping position, said film sheath sheet and prints are dropped into said envelope through a chute.

18. A photo-lab system, as claimed in claim 16, wherein said envelope reservoir reserves said envelopes in a horizontal stacked condition, said transporting means feeds out an uppermost of said envelopes into said enveloping position, said film sheath sheet is inserted horizontally into said envelope while said envelope is in said enveloping position.

19. A photo-lab system, as claimed in claim 16, wherein said paper cutting and sorting means comprises:
    a plurality of partition members defining chambers therebetween, each of said chambers being adapted to hold a set of said prints, and means for advancing said partition members toward said enveloping position in a stepwise manner upon each detection of said second ID number code recorded on said photographic paper.

20. A photo-lab system, as claimed in claim 19, wherein said enveloping means includes a hand robot for gripping a set of said prints and inserting them into said envelope while said envelope is in said enveloping position.

21. A photo-lab system, as claimed in claim 1, further including error detecting means for monitoring time intervals between adjacent said second ID codes detected by said second ID code reader and comparing each of said time intervals with a predetermined value, said error detecting means stopping operation of said photo-lab system when said time interval is longer than said predetermined value.

22. A total photo-lab system, as claimed in claim 21, further comprising means for manually designating said ID code and frame number corresponding to a frame to be printed again.

23. A photo-lab system, as claimed in claim 22, wherein said frame designated to be printed again is located in said printing means by rewinding said spliced film roll from said film reservoir section.

24. An automatic enveloping method for a photo-lab system having means for splicing a plurality of films into a roll of spliced film, means for printing images recorded on said films onto a photographic paper, means for processing said photographic paper, said automatic enveloping method comprising the steps of:
    providing a first ID code on each film before splicing;
    reading said first ID code of each of the films when each film is positioned in the printing means,
    recording a second ID code corresponding to said first ID code of each said film on said photographic paper for each set of prints made from each film;
    reading said second ID code recording on said photographic paper after said photographic paper is processed;
    cutting the photographic paper into individual prints and sorting said prints into respective sets;
    reading said first ID code of each film after being printed;
    comparing said second ID code with said first ID code before cutting said film;
    cutting and inserting the film in a film sheath sheet when said first and second ID codes are identical; and
    enveloping a said film sheath sheet and a set of said prints, having corresponding ID codes, together.

25. An automatic enveloping method, as claimed in claim 24, further comprising the step of:
    reserving said films before said cutting and inserting step.

26. An automatic enveloping method, as claimed in claim 25, further comprising the step of:
    generating two labels having the same ID code of which one is used as said first ID code and the other is used as a third ID code, reading said third ID code, and inserting a said film sheath sheet and a set of said prints into said envelope having corresponding ID codes.

27. An automatic enveloping method, as claimed in claim 26, wherein said enveloping step comprises the steps of:
    inserting said film sheath sheet into said envelope and, thereafter inserting a set of said prints into said envelope with reference to said second and third ID codes.

28. An automatic enveloping method, as claimed in claim 26, wherein said enveloping step comprises the steps of:
    gathering a set of said prints with a said film having corresponding first and second ID number codes, and thereafter inserting them concurrently into said envelope.

29. A jamming processing method for a total photo-lab system, wherein each of a plurality of films spliced into a film roll is provided with a first ID code, and a second ID code is recorded on a corresponding position of a photographic paper, said method comprising the steps of:
    reserving said films after printing;
    monitoring time intervals between consecutive of said second ID codes detected from said photographic paper after processing;
    comparing each said time interval with a predetermined value;
    stopping operation of said total photo-lab system when said time interval is longer than said predetermined value;
    designating the first ID code and a frame number of an image frame of the film to be printed again;
    rewinding said film roll thereby moving back said reserved films toward a printing position so as to set the designated frame in said printing position, before each of said reserved films is cut and inserted into a film sheath sheet which is enveloped together with a set of prints made from each film.

* * * * *